(12) United States Patent
Jolivette

(10) Patent No.: US 12,421,023 B2
(45) Date of Patent: Sep. 23, 2025

(54) SECURE STORAGE CONTAINER

(71) Applicant: Southwire Company, LLC, Carrollton, GA (US)

(72) Inventor: Wilbert L. Jolivette, Houston, TX (US)

(73) Assignee: Southwire Company, LLC, Carrollton, GA (US)

( * ) Notice: Subject to any disclaimer, the term of this patent is extended or adjusted under 35 U.S.C. 154(b) by 353 days.

(21) Appl. No.: 18/051,693

(22) Filed: Nov. 1, 2022

(65) Prior Publication Data

US 2023/0159264 A1 May 25, 2023

Related U.S. Application Data

(60) Provisional application No. 63/263,383, filed on Nov. 1, 2021.

(51) Int. Cl.
*B65B 3/02* (2006.01)
*B62B 3/02* (2006.01)
*B62B 3/04* (2006.01)
*B62B 5/06* (2006.01)
*B65D 6/16* (2006.01)
*B65D 25/28* (2006.01)
(Continued)

(52) U.S. Cl.
CPC .............. *B65D 88/528* (2013.01); *B62B 3/02* (2013.01); *B62B 3/04* (2013.01); *B62B 5/06* (2013.01); *B62B 5/067* (2013.01); *B65D 7/24* (2013.01); *B65D 25/2841* (2013.01); *B65D 55/14* (2013.01); *B65D 2211/00* (2013.01); *B65D 2251/1016* (2013.01); *B65D 2255/00* (2013.01); *B65D 2525/286* (2013.01); *B65D 2555/02* (2013.01); *B65D 2588/02* (2013.01); *B65D 2590/666* (2013.01)

(58) Field of Classification Search
CPC .... B65D 88/528; B65D 7/24; B65D 25/2841; B65D 55/14; B65D 2211/00; B65D 2251/1016; B65D 2255/00; B65D 2525/286; B65D 2555/02; B65D 2588/02; B65D 2590/666; B62B 3/02; B62B 3/04; B62B 5/06; B62B 5/067
See application file for complete search history.

(56) References Cited

U.S. PATENT DOCUMENTS 4,068,349 A * 1/1978 Rock ..................... E05D 5/0276
16/238
10,947,037 B2 * 3/2021 Havener .............. B65D 88/528

* cited by examiner

Primary Examiner — Bryan A Evans
(74) Attorney, Agent, or Firm — Merchant & Gould P.C.

(57) ABSTRACT

Secure storage carts are disclosed herein and capable of being assembled and disassembled on-site without common disadvantages that affect storage carts designed for on-site assembly. Secure storage carts disclosed herein may be assembled to a reduced tolerance, eliminating potential points of failure in the assembled cart, and giving the user a more solid feel to the operation. Methods for assembling storage carts are also disclosed herein and can include adjusting the extension depth of a door panel hinge. Methods disclosed herein also may include applying a preloading force to the cart frame, to reduce tolerances between components of the storage cart once assembled. Kits are also provided herein containing the components required to assemble the cart on-site, in configurations that may be easily transported to and from the job site when disassembled. Kits also may provide for straightforward and secure assembly of the carts.

23 Claims, 4 Drawing Sheets

(51) Int. Cl.
*B65D 55/14* (2006.01)
*B65D 88/52* (2006.01)

SECURE STORAGE CONTAINER

CROSS-REFERENCE TO RELATED APPLICATION

This application is a non-provisional application which claims a benefit of priority to U.S. Provisional Application No. 63/263,383, filed Nov. 1, 2021, the entire contents of which are hereby incorporated by reference herein.

BACKGROUND

Storage carts are necessarily present at construction sites to secure valuable tools not in active use, in a temporary and mobile fashion. Storage carts typically are provided pre-assembled, and disposed after a particular construction project is complete or when the cart becomes unfit for practical use through normal wear. Storage carts have also been provided as a kit for on-site assembly, however, such carts often suffer from disadvantages including high tolerances at the edges and corners of frame where frame panels connect, difficult and tedious assembly and edges and corners. Large tolerances in the assembled cart can suggest an insecure construction to the user that generates vibration and noise during transport of the cart. Large tolerances in the assembly also can have a deleterious effect on the security of the cart, as a common point of failure in secure carts are edges and corners that allow a tool to be inserted as a wedge to pry frame panels apart.

Accordingly, it would be advantageous to provide a storage cart kit for on-site assembly of a storage cart, where the storage cart demonstrate and maintain decreased tolerances following assembly and extended use. Storage carts having improved assembly methods, with respect to ease of assembly, security of the assembled storage cart, and adjustability of relative position of individual components to the cart at large, including as the angle of door panels relative to the cart, the position of the handle relative to the cart, and the tolerance between frame panels of the cart.

SUMMARY

Disclosed herein are secure storage carts configured to be assembled from a packaged kit on-site without skilled labor or specialized tools.

Kits for on-site assembly of a storage cart of carts disclosed herein are also contemplated, and can comprise a door panel, a plurality of frame panels, and a tolerance adjustment mechanism configured to apply a preloading force to the plurality of frame panels when the storage cart is assembled, each as unassembled and individual component of the kit. Kits disclosed herein also can comprise an adjustable depth hinge. Kits disclosed herein also can comprise a handle comprising a handle base that extends between, and is secured within, each of a first and second handle receiver, wherein each of the first and second handle receiver is welded to one of the plurality of frame panels.

Methods for assembling kits disclosed herein are also contemplated and can comprise fastening a plurality of frame panels to each other, attaching a door panel to one of the plurality of frame panels, and applying a preloading force to the plurality of frame panels using the tolerance adjustment mechanism. Methods disclosed herein also can comprise attaching the door panel by advancing a threaded portion of a hinge to the door panel to an appropriate depth, inserting an opposing, unthreaded portion of the hinge into a receiving slot of one of the plurality of frame panels, and optionally, locking the hinge. Methods disclosed herein also can comprise alternating a handle position from a storage position to an operational position without fastening, removing, or displacing a fastener.

DETAILED DESCRIPTION

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Figure 1:
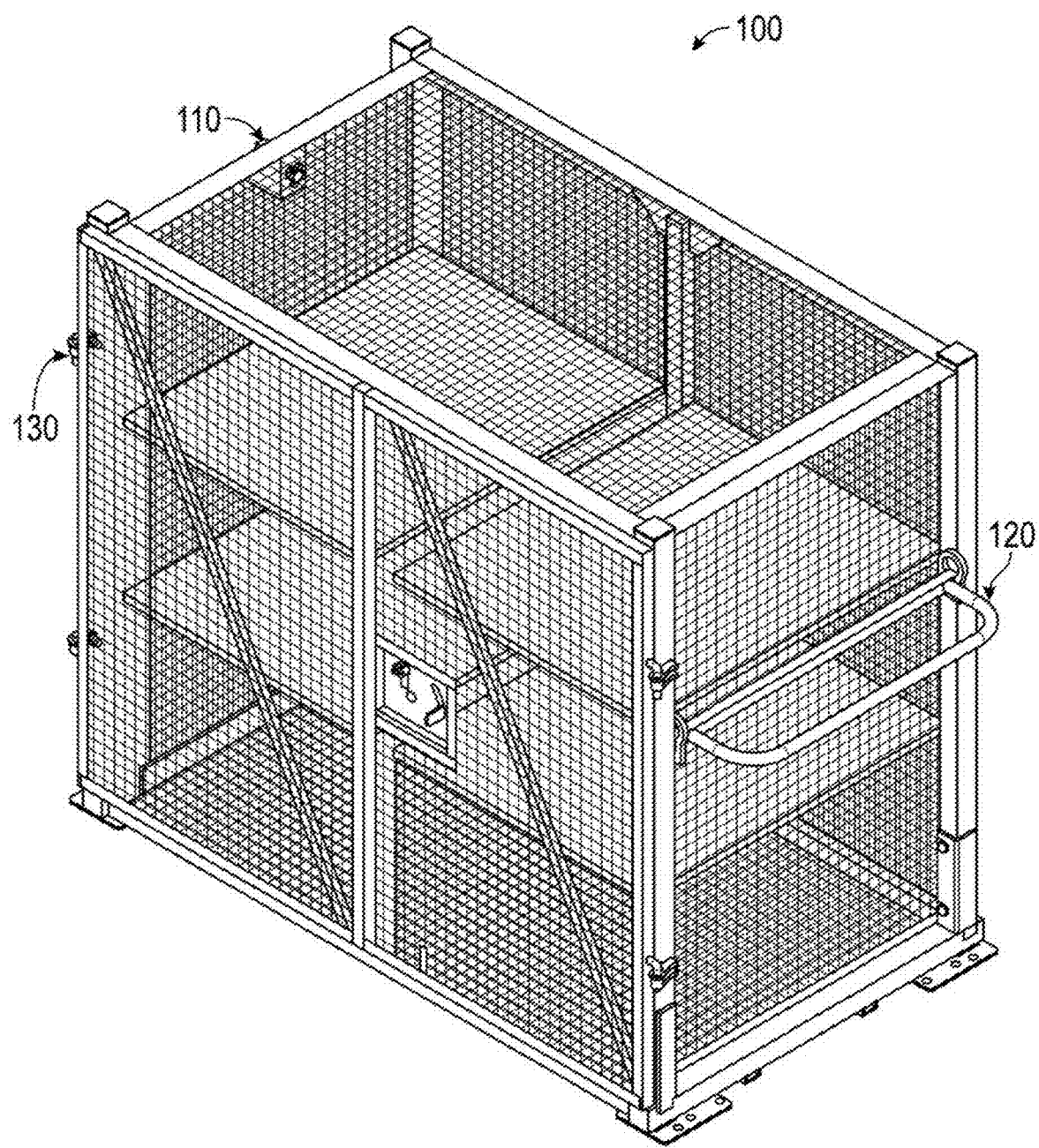
FIG. 1 depicts an embodiment of a storage cart, assembled, and with a handle in an operational position.
Figure 2:
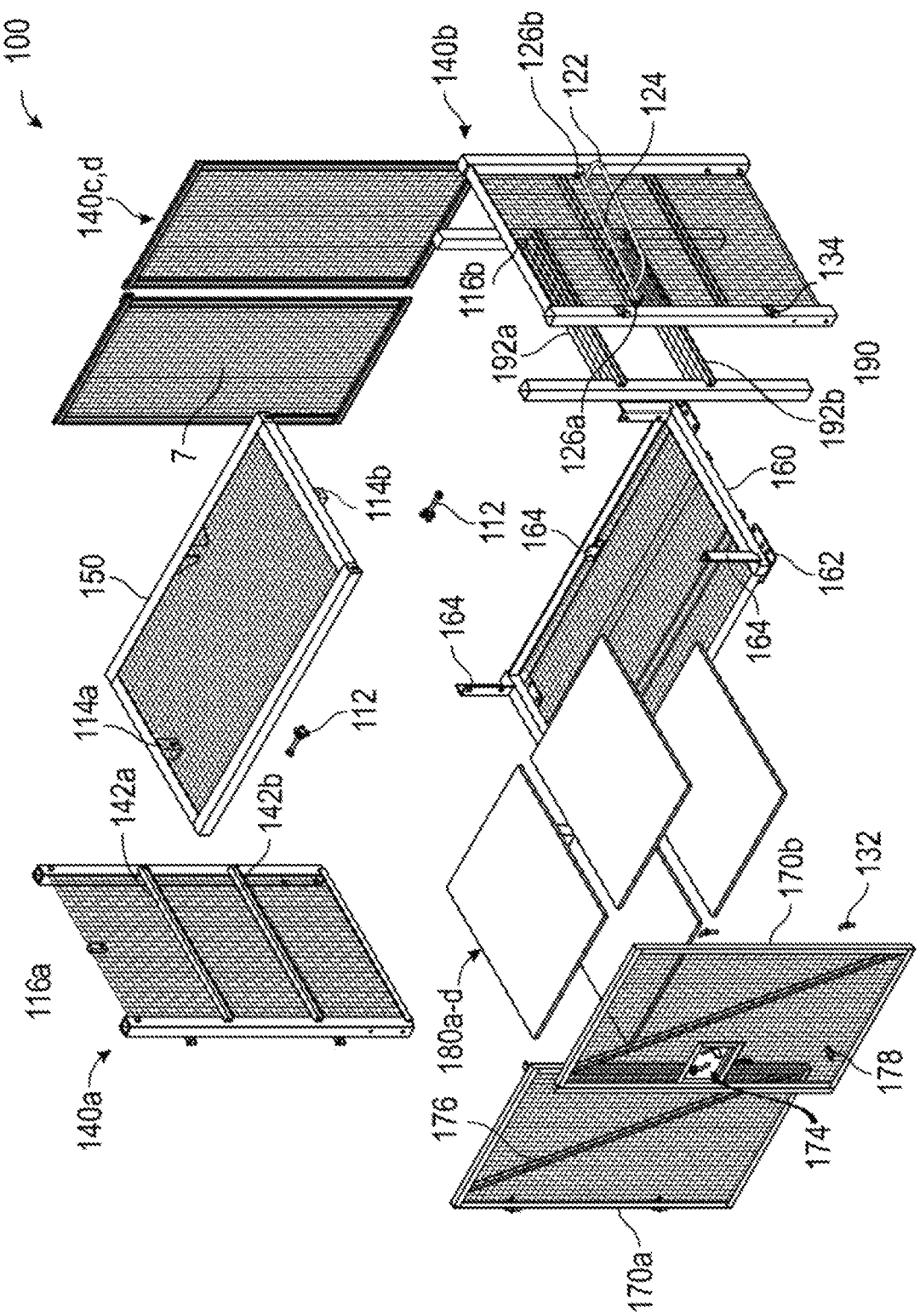
FIG. 2 depicts an exploded view of the storage cart of FIG. 1, as a kit, and with a handle in a storage position within a frame panel.

FIGS. 1-2 show an embodiment of a storage cart contemplated herein, assembled as a storage cart and in an exploded kit view, respectively. As shown in FIG. 1, storage cart 100 can take a conventional shape with several rectangular mesh panels to prevent entry into the cart when closed. Use of wire mesh can allow the user to see into the cart without opening, and also prevent dirt and debris from accumulating in the cart during use. Cart 100 can comprise a tolerance adjustment mechanism 110 configured to apply a preloading force to the cart, a handle 120 configured to alternate between storage and operational positions, and hinge 130 configured to allow angular adjustment between panels connected to the hinge.

As shown in FIG. 2, cart 100 can comprise a plurality of frame panels, each connecting to constitute the primary structural component of the cart. Side frame panels 140a-d define the perimeter of cart 100, and are fixed in position relative to the cart once assembled. Top panel 150 and bottom panel 160 each enclose cart 100 at its respective vertical extremes. Door panels 170a,b complete the perimeter of cart 100, and provide access to the interior of cart 100 when opened. Shelf panels 180a-d provide internal storage space to the cart and additional dimensional stability. Central interior panel 190 also provides dimensional stability along the width of cart 100, and provides medial supports 192a,b for shelf panels 180a-d, also supported at the edges of the cards by supports 142a-d present on side panels 140a,b.

Each frame panel can provide support for additional cart components. For instance, tolerance adjustment mechanism 110 comprises first aperture 114 housed on top panel 150, a second aperture 116 housed on side panel 140a and aligned with the first aperture to receive knob screw 112. In this arrangement, tolerance adjustment mechanism 110 shown in FIG. 1 can apply a preloading force between side panels 140a and top panel 150 directly, and indirectly to frame panels connected to panels 140a and 150, by advancing knob screw 112 within second aperture 116. As for perimeter panels, tolerance adjustment mechanism 110 can reduce the a tolerance between the shelf panel 180, and central panel 190, with respect to any of the plurality of frame panels.

Generally, tolerance adjustment mechanisms disclosed herein are not limited to a particular design, and can be any that are capable of applying a preloading force to a plurality of assembled frame panels. Tolerance adjustment mechanisms disclosed herein therefore can act to reduce tolerances between the assembled panels and reduce vibration of the panels, particularly relative to the cart when empty (e.g., the cart does not have a load applied to the frame by stored tools and equipment). In certain aspects, tolerance adjustment mechanisms can comprise a fastener configured to be advanced across two or more frame panels, pulling the panels closer together as advanced. For instance, an embodiment of a tolerance adjustment mechanism disclosed herein can comprise a knob screw, a first aperture within one frame panel, and a second aperture within another frame panel, wherein each aperture is configured to receive the knob screw. In certain aspects, the first and/or second apertures can be threaded apertures.

The preloading force applied by the tolerance adjustment mechanism can be in any range suitable to reduce or eliminate a tolerance between a plurality of frame panels. from 10N to 1,000N, or roughly equivalent to a load applied to the frame by 1 to 100 lbs of equipment stored within the cart. In other aspects, the preloading force may be in a range from 250N to 5,000N.

Tolerance adjustment mechanisms can be positioned such that operation is only possible from the interior of the cart, to prevent release of the preloading force by unauthorized parties. Any positioning within the cart, such as behind a guard, plate, or within a aperture, can be effective for restricting access to the tolerance adjustment mechanism from outside the locked cart.

The preloading force may be advantageously applied to the cart at more than one position, by the inclusion of more than one tolerance adjustment mechanisms within the assembled structure. In certain aspects, carts can comprise one, two, three, four, or more tolerance adjustment mechanisms to distribute the preloading force about the assembled frame panels. For instance, carts disclosed herein can comprise two tolerance adjustment mechanisms in opposing positions, or in other words, apply a preloading force in opposing directions. The embodiment shown in FIGS. 1-2 provides an example of such a cart, where two tolerance adjustment mechanisms are provided at opposing top ends of the top panel 150 and each of side panels 140a,b. Each tolerance adjustment mechanism 110 is positioned to apply the preloading force toward the center of the cart, and therefore tends to reduce the tolerance between assembled panels 140a,b and 150, as well as other panels in contact with panels 140a,b and 150.

Without being bound by theory, the application of a preloading force to the frame panels after assembly as described herein can allow greater manufacturing tolerances for the individual components of the cart provided as a kit to be assembled on site without sacrificing the low tolerances achieved by the assembled carts disclosed herein. The preloading force can overcome manufacturing tolerances of the frame panels, in certain aspects from 1/32" to 1", while maintaining a tolerance between assembled frame panels of less than 1/2", less than 1/4", less than 1/8", less than 1/16", or less than 1/32". In certain aspects, the sum of maximum tolerances between each of the assembled panels with application of the preloading force of the storage cart can be less than 2", less than 1", or less than 1/2".

FIG. 2 also shows handle 120 supported on side panel 140b, with handle grip 122 shown in a storage position. Handle 120 comprises handle grip 122 extending from handle base 124 formed from steel square tube. Handle receivers 126a,b are welded to the side panel 140b at a distance less than the length of handle base 122, and handle base 122 extends into and is contained within, receiving portion 128 of both handle receivers 126a,b. Thus, handle 120 can be permanently attached to side panel 140b by handle receivers 126a,b, without using a fastener, or removable fastener (e.g., screw, bolt, hinge) securing the handle to the side panel.

Figure 3A:
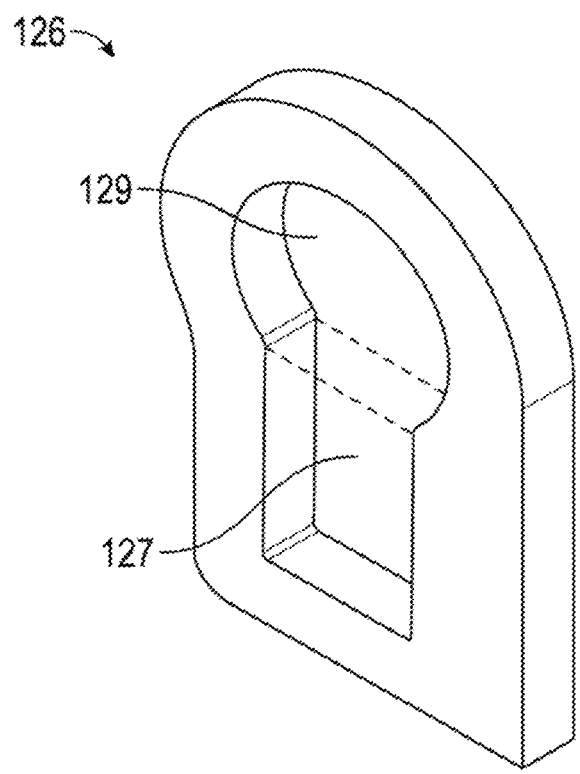
FIG. 3A depicts a perspective view of an embodiment of a handle receiver having a pitched restricted portion.
Figure 3B:
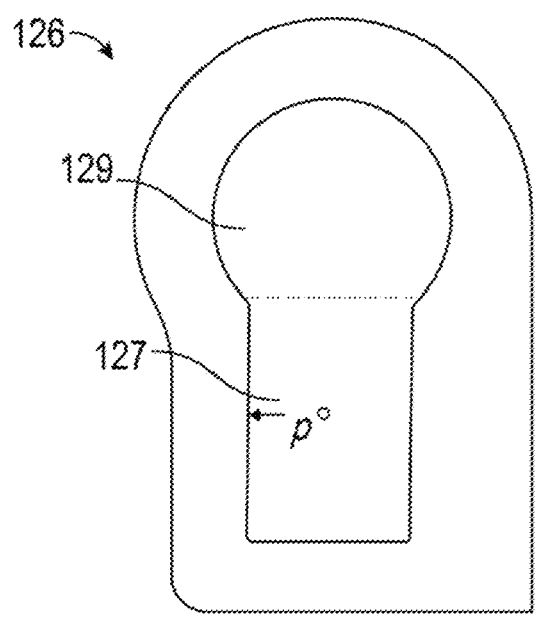
FIG. 3B depicts a front view of an embodiment of a handle receiver having a pitched restricted portion.

FIGS. 3A and 3B provide further detail on handle receivers 126, particularly as to receiving portion 128. As shown, receiving portion 128 represents an internal aperture generally having a keyhole shape with a rectangular, restricted portion 127 at its lower end and a rounded, unrestricted portion 129 at its upper end. Those of skill in the art will understand that as the square tube handle base 124 is advanced into restricted portion 127, rotation of handle 120 will become restricted, securing the handle in a fixed position. Alternatively, as the handle base 124 is moved within the unrestricted portion 129, handle 120 is able to rotate freely with respect to side panel 140b. In this manner, handle 120 can be alternated between a secure storage position and a secure operational position, without removing and replacing a single fastener such as a screw, bolt, or retaining pin.

Generally, handle receivers contemplated herein can be any that comprise a restricted portion configured to restrict rotation of the handle relative to the frame panel and an unrestricted portion configured to allow rotation of the handle between a parallel orientation to a perpendicular orientation, relative to the fixed panel. The restricted portion is not limited to any particular shape or size, and can be driven by the shape and size of the handle base intended to be secured within the restricted portion. For instance, the square tube handle base 122 can be restricted within a rectangular-shaped area of similar dimensions, thus, the generally rectangular restricted portion 127 shown in FIG. 3 can generally be considered appropriate for handle bases such as handle base 124 of the embodiment shown in FIG. 2. In contrast, the unrestricted portion of the handle receiver may generally be any shape that does not prevent or interfere with the rotation of the handle base. Again looking to FIG. 3, a generally circular, or rounded unrestricted portion allows rotation of the square tube handle base 122, and so can be suitable for the intended purpose. Those of skill in the art will understand that additional shapes and sizes of handles and corresponding portions of the handle receiver may be implemented.

In certain aspects, the restricted portion can be pitched relative to the horizontal plane by an amount p, or relative to a plane generally perpendicular to the plane of side panel 140b. Surprisingly, introducing pitch p to restricted portion 127 causes a shear force produced by pushing or pulling handle 120 to have a downward vector component to handle base 124, such that pushing or pulling handle grip 122 causes the handle 120 to advance downward within restricted portion 127. In this manner, the handle 120 tends to become more secure and solidly connected to the operation of the cart by its use, rather than loosening with use as commonly occurs on carts having handles connected by fasteners. In certain aspects, the restricted portion can comprise a pitch in a range from 0.5 to 5°, from 0.3 to 3° or from 0.5 to 2°, or from 0.5 to 1.5°, relative to horizontal. In certain aspects, the restricted portion can be pitched toward a direction can be directed either toward or away from the frame panel to which the handle is attached. Thus, in certain aspects, the restricted portion can be pitched p relative to horizontal and in a direction of the force applied by pushing the handle.

Figure 4C:
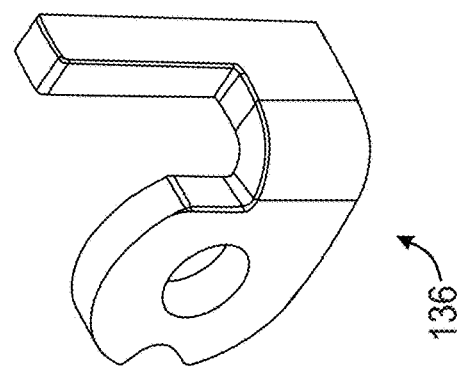
FIG. 4C depicts a perspective view of a hinge lock for operation with the hinge knuckle and hinge pin represented in FIGS. 4A and 4B.
Figure 4B:
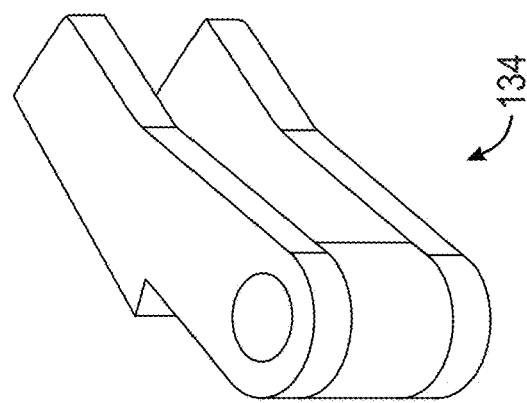
FIG. 4B depicts a perspective view of a hinge knuckle as part of the hinge.
Figure 4A:
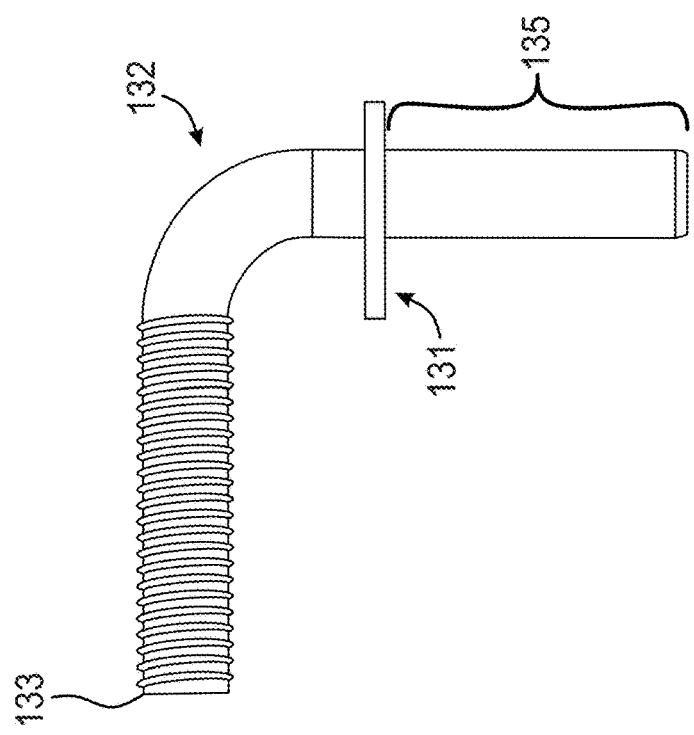
FIG. 4A depicts a side view of an embodiment of an adjustable depth hinge pin.

Returning now to FIG. 2, each door panel 170a,b may be secured to adjacent panels of the cart by hinge 130. As shown, hinge 130 can comprise hinge pin 132 having a threaded portion extending orthogonally from the unthreaded pin, the threaded portion configured to be fastened within threaded hinge aperture 172 at a variable depth. The pin may then be inserted within hinge knuckle 134, shown in FIG. 2 welded to side panel 140b, to allow rotation of door panel 170b about the hinge pin 132. The angle of the door panel can therefore be adjusted in a straightforward manner, by adjusting the depth of the threaded portion of hinge pin 172 within threaded aperture 172 of door panel 170b. Such adjustment ensures that the door panels will meet other frame panels at an appropriate position such that components of the cart are in alignment. For instance, door panel handle lock 174 can be aligned to the mating component of door panel 170a. As for other panels, the tolerance between the door panels 170a,b also can be reduced by tuning the depth of the threaded portion of hinge pin 132 within aperture 172. A hinge lock may also be provided to seat within the gap formed by plates of hinge knuckle 134 and secure the hinge pin 132 to knuckle 134 when assembled. FIG. 4A-C provide an example of a hinge 130 operable as described above. FIG. 4A shows hinge pin 132 having threaded portion 133 that can be rotated into a mating threaded aperture of door panel 170a,b to an adjustable depth. Unthreaded portion 135 of hinge pin 132 can then be inserted within the aperture of hinge knuckle 134, until washer stop 131 rests against the top surface of the hinge knuckle. FIG. 4C depicts an embodiment of a hinge lock 136 that may be inserted within the hinge knuckle 134 in order to prevent hinge 130 from being disassembled without unlocking and opening the door panel 170a,b.

The cart panel shown in FIG. 2 also comprises several brackets 164 for securing the frame panels to one another, and several brackets 164 are shown welded to bottom frame panel 160. Generally, the panels can be secured to panels by inserting fasteners through an internal face of the bracket to ensure that the assembled cart cannot be disassembled from the exterior. As will be appreciated, the shape and positioning of brackets may be any that allow the panels to be assembled to provide a secure and solid construction. Bottom frame panel 160 may also include footings 162, to provide stability. In certain aspects, footings can be adjustable. In other aspects, footings can comprise wheels to impart mobility to the cart.

In addition to door panel handle lock 174, door panel 170b comprises a pin lock 178 that can be seated within bottom frame 160 to retain door panel 170b in a closed position. Frame panels may also comprise additional internal supports, for instance diagonal support 176 of door panel 170a which provides dimensional support to the panel.

Certain aspects of the carts described above may be particularly useful as packaged as kits for carts intended for on-site assembly and disassembly. In certain aspects, the tolerance adjustment mechanism can provide an efficient method of assembling a storage cart that does not suffer from large tolerances typically associated with on-site assembled carts. Thus, in certain aspects, kits disclosed herein can comprise a plurality of frame panels, a door panel, and a tolerance adjustment mechanism. Similarly, kits comprising the adjustable depth hinges allow for an improved on-site assembly through straightforward adjustment of the door panel angle.

Methods for assembling a secure storage cart are also contemplated herein, and generally can include steps of adjusting the angle of a door panel by advancing an adjustable depth hinge pin into the door panel as described above. Methods may also include alternatively positioning a handle of any storage cart between an operating position and a storage position without removing or replacing fasteners to the handle. Methods disclosed herein also may comprise adjusting the tolerance of an assembled plurality of frame panels of the carts disclosed herein from the interior of the cart.

The invention claimed is:

1. A lockable storage cart, the cart comprising:
a door panel;
a plurality of frame panels;
a tolerance adjustment mechanism configured to apply a preloading force to the plurality of frame panels when the storage cart is assembled; and
a tolerance adjustment guard preventing access to the tolerance adjustment mechanism from the exterior of the storage cart.

2. The cart of claim 1, wherein the preloading force is in a range from 10 N to 1000 N.

3. The cart of claim 1, wherein the tolerance adjustment mechanism comprises:
a knob screw;
a first threaded aperture within one of the plurality of frame panels configured to receive the knob screw; and
a second threaded aperture within another of the plurality of frame panels configured to receive the knob screw.

4. The cart of claim 1, further comprising a second tolerance adjustment mechanism.

5. The cart of claim 1, wherein each of the plurality of frame panels has a manufacturing tolerance in a range from about 1/32" to about 1".

6. The cart of claim 1, wherein at least one of the plurality of frame panels comprises a wire mesh surface.

7. The cart of claim 1, wherein the door panel comprises a door lock configured to secure the position of the door relative to at least one of the plurality of frame panels.

8. The cart of claim 1, further comprising an adjustable depth hinge to attach the door panel to one of the plurality of frame panels.

9. The cart of claim 8, wherein the adjustable depth hinge comprises a threaded portion and an unthreaded portion, wherein the threaded portion is orthogonal to the unthreaded portion.

10. The cart of claim 1, wherein at least one of the plurality of frame panels comprises a handle configured to be alternately positionable between an operating position and a storage position.

11. The cart of claim 10, wherein:
the handle comprises a handle grip extending from the handle base;
the handle grip is perpendicular to the frame panel when the handle is in the operating position; and
the handle grip is parallel to, or within, the frame panel when the handle is in the storage position.

12. The cart of claim 10, wherein the handle comprises a handle base extending between a first and second handle receiver.

13. The cart of claim 12, wherein each of the first and second handle receivers are welded to a frame panel.

14. The cart of claim 12, wherein each of the first and second handle receivers comprises:
   a restricted portion configured to restrict rotation of the handle relative to the frame panel; and
   an unrestricted portion configured to allow rotation of the handle between a parallel orientation to a perpendicular orientation, relative to the fixed panel.

15. The cart of claim 14, wherein the restricted portion comprises a pitched edge in the direction of the force applied by pushing the handle.

16. The cart of claim 15, wherein the pitched edge has a pitch in a range from 0.5% to 2% relative to a surface of the frame panel.

17. The cart of claim 1, wherein the cart comprises two door panels, each door panel comprising two adjustable depth hinges.

18. The cart of claim 4, wherein the first and second tolerance adjustment mechanisms are arranged to apply a preloading force in opposing directions, and arranged on opposing sides of the cart.

19. A kit for on-site assembly of a storage cart of claim 1, the kit comprising:
   a door panel;
   a plurality of frame panels; and
   a tolerance adjustment mechanism configured to apply a preloading force to the plurality of frame panels when the storage cart is assembled; and
   a tolerance adjustment guard preventing access to the tolerance adjustment mechanism from the exterior of the storage cart.

20. The kit of claim 19, further comprising an adjustable depth hinge.

21. The kit of claim 19, further comprising a handle base extending between, and secured within, each of a first and second handle receiver, wherein each of the first and second handle receiver is welded to one of the plurality of frame panels.

22. A method for assembling a lockable storage cart, the method comprising:
   fastening a plurality of frame panels to each other;
   attaching a door panel to one of the plurality of frame panels; and
   applying a preloading force to the plurality of frame panels using a tolerance adjustment mechanism; and
   alternating a handle position from a storage position to an operational position without fastening, removing, or displacing a fastener.

23. The method of claim 22, wherein attaching the door panel comprises:
   advancing a threaded portion of a hinge to the door panel to an appropriate depth;
   inserting an opposing, unthreaded portion of the hinge into a receiving slot of one of the plurality of frame panels; and
   optionally, locking the hinge.

* * * * *